United States Patent
Yamaguchi et al.

(10) Patent No.: US 11,190,074 B2
(45) Date of Patent: Nov. 30, 2021

(54) INSULATING MEMBER, STATOR OF ROTARY ELECTRIC MACHINE, AND ROTARY ELECTRIC MACHINE

(71) Applicant: HONDA MOTOR CO., LTD., Tokyo (JP)

(72) Inventors: Tadashi Yamaguchi, Wako (JP); Ming Lei, Tokyo (JP); Shohei Ogino, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 167 days.

(21) Appl. No.: 16/477,272

(22) PCT Filed: Jan. 15, 2018

(86) PCT No.: PCT/JP2018/000781
§ 371 (c)(1),
(2) Date: Jul. 11, 2019

(87) PCT Pub. No.: WO2018/131703
PCT Pub. Date: Jul. 19, 2018

(65) Prior Publication Data
US 2021/0135529 A1    May 6, 2021

(30) Foreign Application Priority Data
Jan. 16, 2017  (JP) .............................. JP2017-005106

(51) Int. Cl.
*H02K 3/34*    (2006.01)
(52) U.S. Cl.
CPC ...................................... *H02K 3/345* (2013.01)
(58) Field of Classification Search
CPC ..................................................... H02K 3/345
See application file for complete search history.

(56) References Cited

U.S. PATENT DOCUMENTS

| | | | | |
|---|---|---|---|---|
| 2,180,983 A | * | 11/1939 | Hall | H02K 3/345 |
| | | | | 310/215 |
| 3,130,335 A | * | 4/1964 | Rejda | H02K 3/345 |
| | | | | 310/215 |

(Continued)

FOREIGN PATENT DOCUMENTS

| | | |
|---|---|---|
| JP | S64-034143 A | 2/1989 |
| JP | 2009-071945 A | 4/2009 |

(Continued)

OTHER PUBLICATIONS

International Search Report dated Apr. 10, 2018, issued in counterpart application No. PCT/JP2018/000781, w/English translation (2 pages).

(Continued)

*Primary Examiner* — Robert W Horn
(74) *Attorney, Agent, or Firm* — Westerman, Hattori, Daniels & Adrian, LLP

(57) ABSTRACT

An insulating paper (40) is inserted into a slot (13) of a stator core (10) of a rotary electric machine and insulates between the stator core (10) and a stator coil (20) disposed in the slot (13). An insulating member (40) comprises a sheet-shaped insulating base material (50), and a first adhesive layer (60A) which is provided on a first surface (50a) of the insulating base material (50) and which is formed of an adhesive. The first adhesive layer (60A) is provided with an exposed section (61) which extends in the axial direction of the stator core (10) and in which the insulating base material (50) is exposed from the adhesive.

9 Claims, 8 Drawing Sheets

(56) References Cited

U.S. PATENT DOCUMENTS

| | | | | |
|---|---|---|---|---|
| 4,808,872 | A | * | 2/1989 | Lund .................... H02K 3/345 |
| | | | | 310/215 |
| 5,034,643 | A | * | 7/1991 | Trian .................... H02K 3/50 |
| | | | | 310/215 |
| 8,575,814 | B2 | * | 11/2013 | Chamberlin ........... H02K 3/345 |
| | | | | 310/215 |
| 9,331,536 | B2 | * | 5/2016 | Mabuchi .............. H02K 15/105 |
| 2019/0020239 | A1 | * | 1/2019 | Tsujimori ................ H02K 1/16 |
| 2019/0109506 | A1 | * | 4/2019 | Yamaguchi ............ H02K 3/345 |
| 2020/0227987 | A1 | * | 7/2020 | Yamaguchi ............ H02K 15/10 |
| 2021/0135529 | A1 | * | 5/2021 | Yamaguchi ............ H02K 3/345 |

FOREIGN PATENT DOCUMENTS

| | | |
|---|---|---|
| JP | 2010-158121 A | 7/2010 |
| JP | 2011-244596 A | 12/2011 |
| JP | 2013-9499 A | 1/2013 |
| JP | 2016-052226 A | 4/2016 |

OTHER PUBLICATIONS

Extended (Supplementary) European Search Report dated Oct. 25, 2019, issued in counterpart application No. 18739385.5. (7 pages).
Extended European Search Report dated May 11, 2020, issued in counterpart EP Application No. 20166629.4. (8 pages).

* cited by examiner

INSULATING MEMBER, STATOR OF ROTARY ELECTRIC MACHINE, AND ROTARY ELECTRIC MACHINE

TECHNICAL FIELD

The present invention relates to an insulating member, a stator of a rotary electric machine, and a rotary electric machine.

Priority is claimed on Japanese Patent Application No. 2017-005106, filed Jan. 16, 2017, the content of which is incorporated herein by reference.

BACKGROUND ART

A rotary electric machine having a stator and a rotor is mounted in a vehicle such as an electric car or a hybrid car. Teeth of the stator extending in a radial direction thereof are provided on a stator core (iron core) of the stator. Slots through which a coil can be inserted are formed between the teeth of the stator adjacent to each other in a circumferential direction thereof. An insulating member for providing insulation between the stator core and the coil is inserted between the slots and the coil. As a method for fixing the stator core and the coil, for example, there is a method of pouring varnish into the slot. However, in the method of pouring varnish into the slot, since the varnish poured from one end of the slot flows out from the other end of the slot, the varnish which flows out is discarded, which may increase the manufacturing cost. Therefore, as a method of fixing the stator core and the coil, for example, as described in Patent Document 1 and Patent Document 2, there is a method of disposing an adhesive such as a foamed adhesive which is foamed by heating on both main surfaces of an insulating member.

CITATION LIST

[Patent Document]

[Patent Document 1] Japanese Patent Application, Publication No. 2011-244596

[Patent Document 2] Japanese Patent Application, Publication No. 2013-9499

SUMMARY OF INVENTION

Technical Problem

However, in the case where the insulating member having the adhesive disposed on both main surfaces is inserted into the slot, the adhesive may come into contact with an edge of the slot and be peeled off when the insulating member is inserted into the slot. Therefore, in the conventional techniques, there is a problem of inhibiting generation of foreign matter when the insulating member is inserted into the slot.

An aspect of the present invention aims to provide an insulating member, a stator of a rotary electric machine, and a rotary electric machine which can inhibit generation of foreign matter when the rotary electric machine is manufactured.

Solution to Problem

An insulating member according to an aspect of the present invention is an insulating member inserted into a slot of an iron core of a rotary electric machine and thereby insulating the iron core from a coil disposed in the slot, which is characterized by including a sheet-shaped insulating base material having a first surface and a second surface, and an adhesive layer which is provided on at least one of the first surface and the second surface of the insulating base material and formed of an adhesive, the adhesive layer being provided with an exposed section which extends in an axial direction of the iron core and in which the insulating base material is exposed from the adhesive.

According to the aspect of the present invention, the adhesive layer is provided with the exposed section which extends in the axial direction of the iron core and in which the insulating base material is exposed from the adhesive. That is, the exposed section is provided at a place where the insulating member easily comes into contact with an end edge of the slot when the insulating member is moved in the axial direction of the iron core and is inserted into the slot. For this reason, it is possible to prevent the adhesive from contacting the end edge of the slot and being peeled off Therefore, generation of foreign matter when the rotary electric machine is manufactured can be inhibited.

In the insulating member mentioned above, it is preferable that the exposed section be provided at a place opposite to a first slot surface facing inward in a radial direction of the iron core among inner surfaces of the iron core surrounding the slot.

When the insulating member is moved in the axial direction and is inserted into the slot, the insulating member is deformed in accordance with a shape of the slot in advance. In the configuration in which the slot is formed to be elongated in the radial direction when viewed in the axial direction, the insulating member easily comes into contact with the first slot surface facing inward in the radial direction of the inner surfaces of the iron core.

According to the aspect of the present invention, the exposed section is provided at the place opposite to the first slot surface. Accordingly, when the insulating member is moved in the axial direction and is inserted into the slot, it is possible to prevent the adhesive from contacting the end edge of the first slot surface and being peeled off Therefore, generation of foreign matter when the rotary electric machine is manufactured can be inhibited.

In the insulating member mentioned above, it is preferable that the slot have a rectangular shape extending in the radial direction of the iron core when viewed in the axial direction, and the exposed section be provided at a place opposite to a first corner portion between the first slot surface facing inward in the radial direction and a second slot surface facing in a circumferential direction of the iron core of the inner surfaces of the iron core.

In one example, when the insulating member is moved in the axial direction and is inserted into the slot, the insulating member is deformed to conform to the shape of the slot in advance. In the configuration in which the slot has the rectangular shape when viewed in the axial direction, the insulating member is bent to conform to the shape of the slot in advance and then inserted into the slot. In this case, the corner portion corresponding to a fold of the insulating member, that is, a place corresponding to the corner portion of the slot, easily comes into contact with the end edge of the corner portion of the slot.

According to the aspect of the invention, in the configuration in which the slot has the rectangular shape extending in the radial direction when viewed in the axial direction, the exposed section is provided at the place opposite to the first corner portion between the first slot surface and the second slot surface. For this reason, when the insulating member is moved in the axial direction and is inserted into the slot, it is possible to prevent the adhesive from contacting the end edge of the first corner portion and being peeled off. Therefore, generation of foreign matter when the rotary electric machine is manufactured can be inhibited.

In the insulating member mentioned above, it is preferable that the exposed section be provided at a place opposite to a second corner portion formed at a radially inner end portion of the iron core in the second slot surface facing in the circumferential direction of the iron core among the inner surfaces of the iron core.

According to the aspect of the present invention, the exposed section is provided at the place opposite to the second corner portion formed at the radially inner end portion of the second slot surface. Accordingly, when the insulating member is moved in the axial direction and is inserted into the slot, it is possible to prevent the adhesive from contacting the end edge of the second corner portion and being peeled off. Therefore, generation of foreign matter when the rotary electric machine is manufactured can be inhibited.

In the insulating member mentioned above, it is preferable that the adhesive layer be provided on both the first surface and the second surface of the insulating base material, and the exposed section be provided to have front and back symmetry with respect to the insulating base material.

According to the aspect of the present invention, since the insulating member is formed with front and back symmetry, it is possible to use the insulating members without distinguishing between the front and back.

In the insulating member mentioned above, it is preferable that a lubricating layer formed of a lubricant be provided on at least one of the first surface and the second surface of the insulating base material in the exposed section.

According to the aspect of the present invention, since the lubricating layer is provided at a place where it easily comes into contact with the end edge of the slot when the insulating member is moved in the axial direction and is inserted into the slot, the insulating member can be smoothly inserted into the slot.

In the insulating member mentioned above, it is preferable that the insulating base material be provided with a fold, and the exposed section be provided at a place corresponding to the fold.

According to the aspect of the present invention, it is possible to prevent the adhesive from being provided at the fold and being peeled off from the insulating base material. Therefore, generation of foreign matter when the rotary electric machine is manufactured can be inhibited.

A stator of a rotary electric machine according to an aspect of the present invention is characterized by including the aforementioned insulating member and the iron core.

A rotary electric machine according to an aspect of the present invention is characterized by including the aforementioned stator of the rotary electric machine.

According to the aspect of the present invention, since the above-described insulating paper is included, generation of foreign matter in manufacturing is inhibited so that occurrence of assembly failure and the like due to the foreign matter can be inhibited.

Advantageous Effects of Invention

According to the aspects of the present invention, since the adhesive layer is provided with the exposed section which extend in the axial direction of the iron core and in which the insulating base material is exposed from the adhesive, it is possible to prevent the adhesive from contacting the end edge of the slot and being peeled off by the exposed section being provided at a place where the insulating member easily comes into contact with the end edge of the slot when the insulating member is moved in the axial direction of the iron core and is inserted into the slot. Therefore, generation of foreign matter when the rotary electric machine is manufactured can be inhibited.

DESCRIPTION OF EMBODIMENTS

Hereinafter, embodiments of the present invention will be described with reference to the drawings.

First Embodiment

Figure 1:
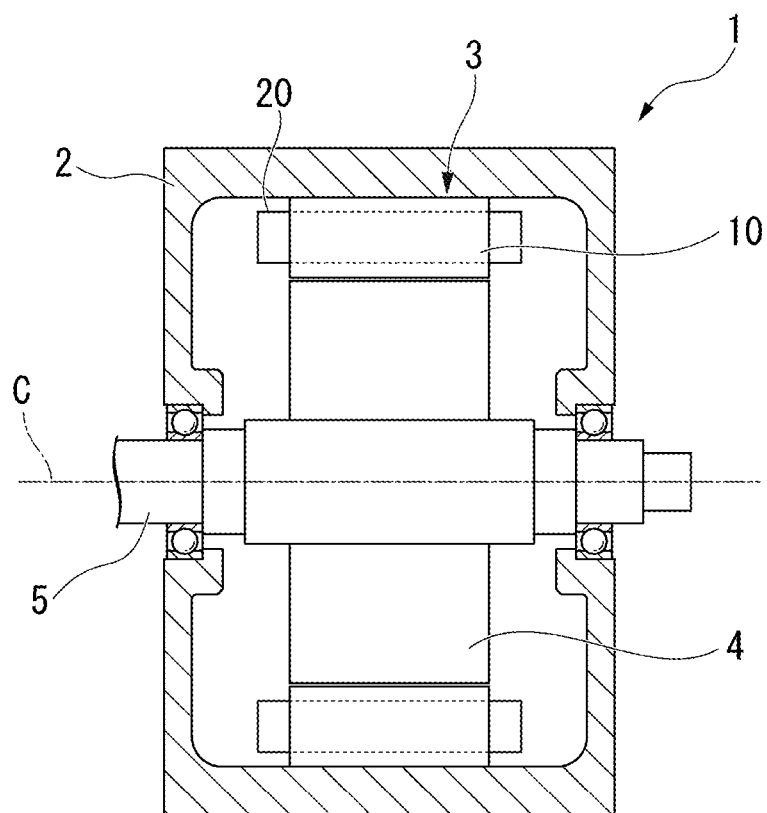
FIG. 1 is a configurational view schematically showing an overall configuration of a rotary electric machine according to a first embodiment.

FIG. 1 is a configurational view (a cross-sectional view) schematically showing an overall configuration of a rotary electric machine according to a first embodiment. As shown in FIG. 1, the rotary electric machine 1 is, for example, a traction motor mounted in a vehicle such as a hybrid car or an electric car. However, the configuration of the present invention is applicable not only to a traction motor but also to a motor generator, a motor for other applications, or a rotary electric machine (including a generator) for something other than a vehicle.

The rotary electric machine 1 includes a case 2, a stator 3, a rotor 4, an output shaft 5, and a refrigerant supply system (not shown). The refrigerant supply system supplies a refrigerant to the stator 3, the rotor 4, etc. An example of the refrigerant is, for example, hydraulic oil used for lubrication, power transmission, and the like in a transmission of an automatic transmission (AT). The rotary electric machine 1 is used in a state where a part of the stator 3 is immersed in the refrigerant.

The output shaft 5 is rotatably supported by the case 2. The rotor 4 is formed in a cylindrical shape externally fitted into the output shaft 5. Also, in the following description, a direction along an axis C of the output shaft 5 is referred to as an axial direction, a direction that is perpendicular to the axis C and extends radially from the axis C is referred to as a radial direction, and a circumferential direction around the axis C is simply referred to as a circumferential direction.

Figure 2:
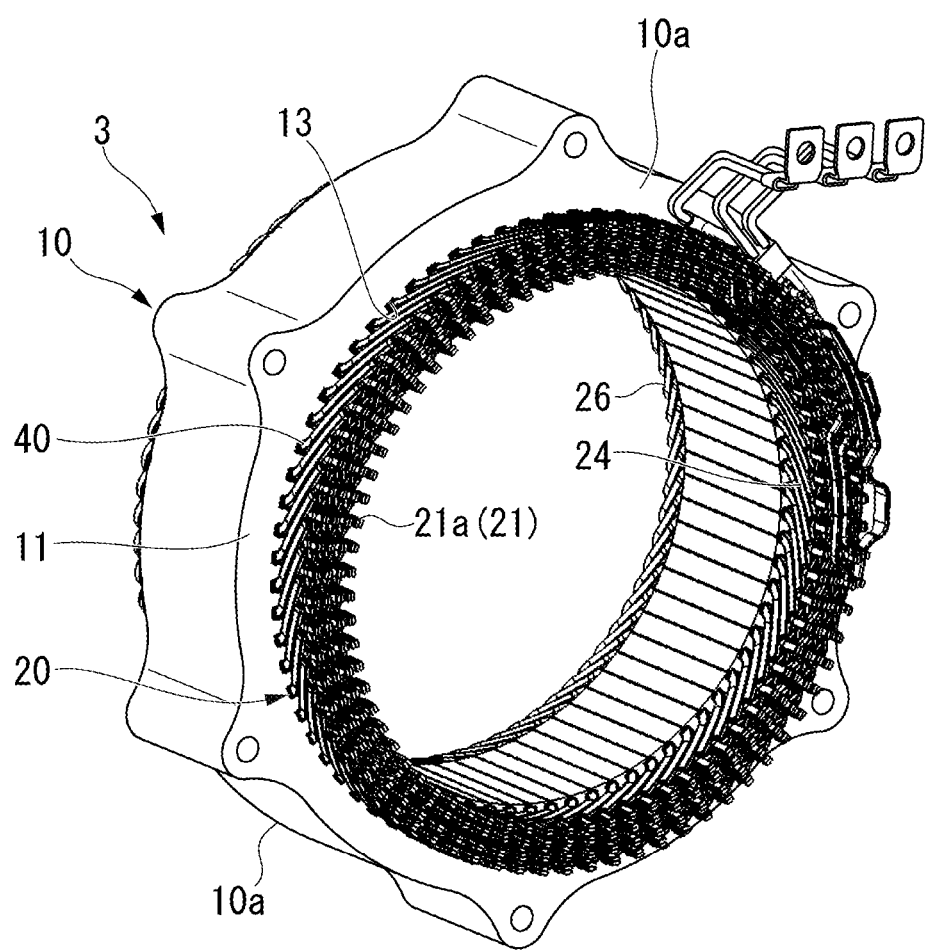
FIG. 2 is a perspective view of a stator according to the first embodiment.
Figure 3:
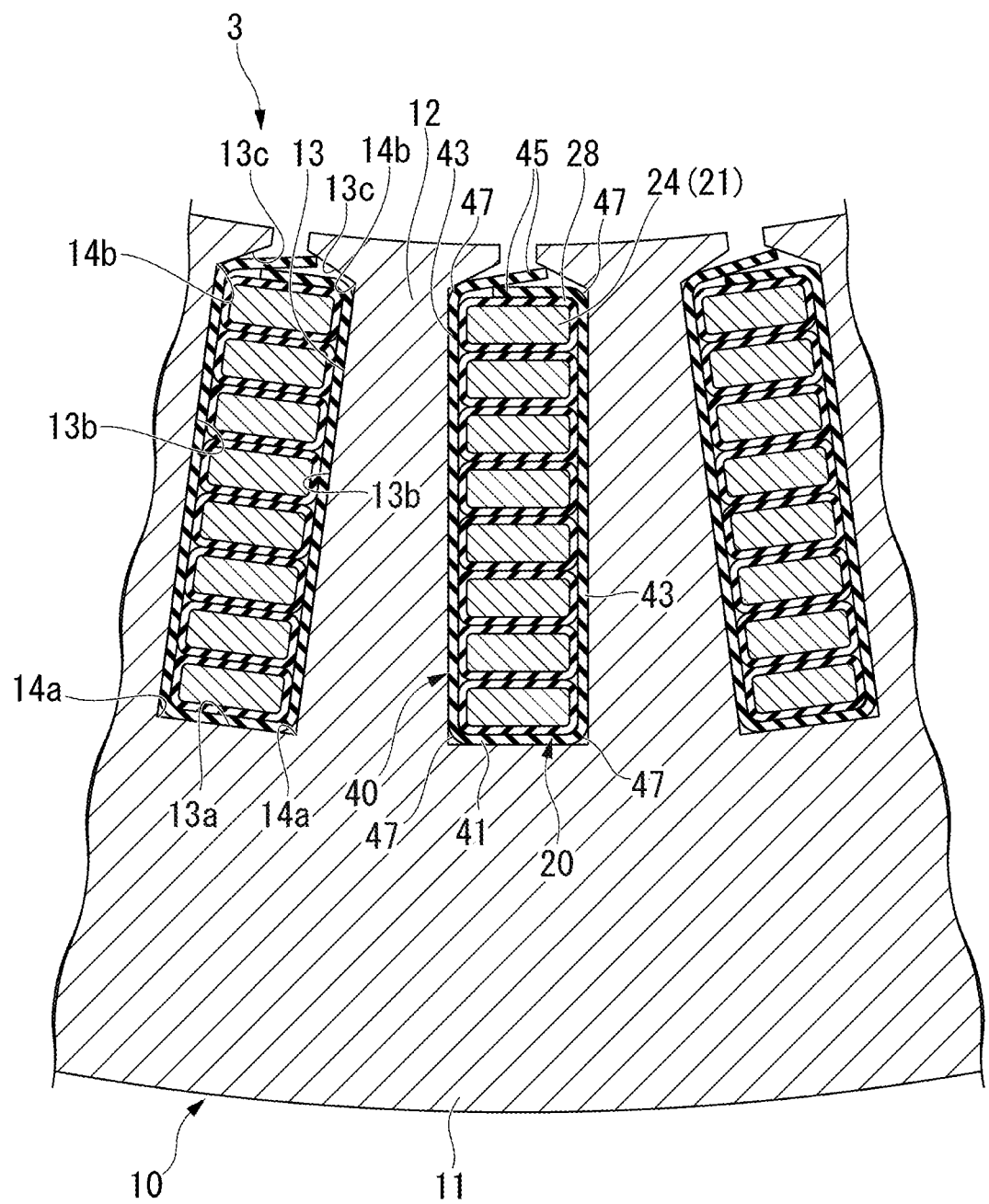
FIG. 3 is a cross-sectional view showing a part of the stator according to the first embodiment.

FIG. 2 is a perspective view of the stator according to the first embodiment. FIG. 3 is a cross-sectional view showing a part of the stator according to the first embodiment. Also, in FIG. 3, a slot insulating paper 40, which will be descried later, is shown and simplified.

As shown in FIGS. 2 and 3, the stator 3 includes a stator core (an iron core) 10 and a stator coil (a coil) 20 of multiple phases (for example, a U phase, a V phase, and a W phase) mounted on the stator core 10, and a slot insulating paper 40 (an insulating member) which insulates between the stator core 10 and the stator coil 20.

The stator core 10 is formed in a cylindrical shape coaxial with the axis C, which surrounds the rotor 4 (see FIG. 1) from the outside in the radial direction. As shown in FIG. 3, the stator core 10 includes a cylindrical back yoke 11 and a plurality of teeth 12 protruding radially inward from an inner circumferential surface of the back yoke 11. Slots 13 having a groove shape are provided between the teeth 12 adjacent to each other in the circumferential direction of the stator core 10. That is, in the stator core 10, teeth 12 and slots 13 are alternately disposed in the circumferential direction.

The slot 13 is formed in a rectangular shape extending in the radial direction when viewed in the axial direction. In one example, the slot 13 has a rectangular shape having a major axis in the radial direction. An inner surface (a slot forming surface) of the stator core 10 surrounding the slot 13 includes a slot bottom surface (a first slot surface or a first slot forming surface) 13a which faces inward in the radial direction, a pair of slot side surfaces (a second slot surface or a second slot forming surface) 13b which extend inward from both circumferential end portions of the slot bottom surface 13a in parallel in the radial direction, and a pair of slot upper surfaces (a third slot surface or a third slot forming surface) 13c which extend in the circumferential direction from radially inner end portions of the respective slot side surfaces 13b. Outer corner portions (first corner portions) 14a are formed at radially outer end portions of the slot side surfaces 13b. The outer corner portions 14a are formed between the slot bottom surface 13a and each slot side surface 13b. Each outer corner portion 14a is formed at a substantially right angle when viewed in the axial direction. Inner corner portions (second corner portions) 14b are formed at radially inner end portions of the slot side surfaces 13b. The inner corner portions 14b are formed between each slot side surface 13b and the slot upper surface 13c. Each inner corner portion 14b is formed at an obtuse angle when viewed in the axial direction.

Figure 4:
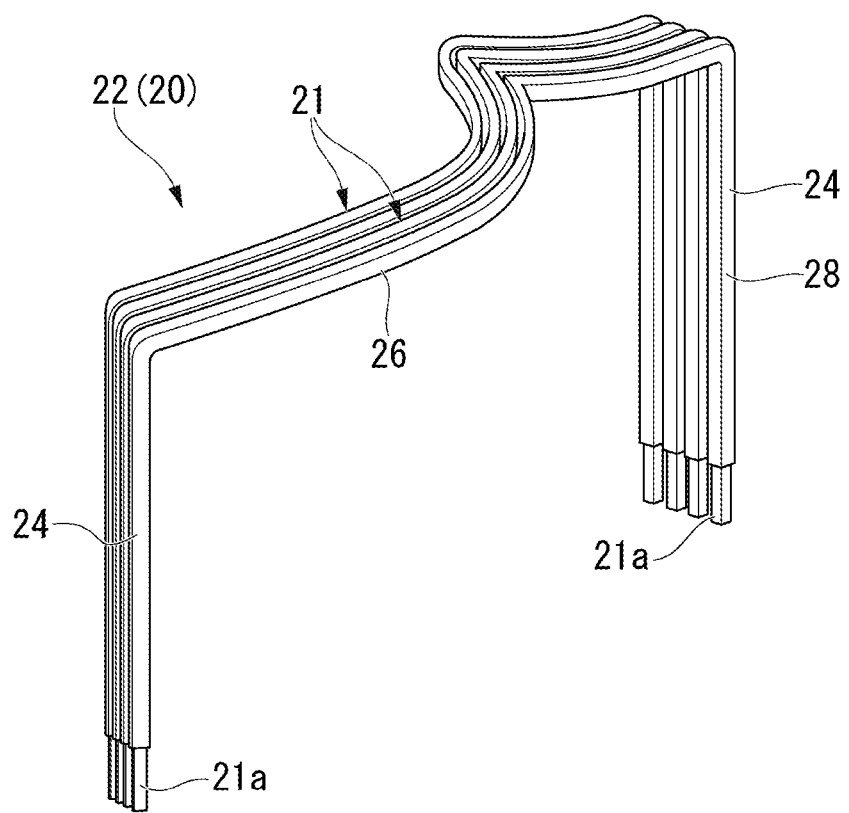
FIG. 4 is a perspective view showing a coil segment group according to the first embodiment.

FIG. 4 is a perspective view of a coil segment group according to the first embodiment. As shown in FIG. 4, the stator coil 20 has a plurality of conductor segments 21 formed of rectangular wires having a rectangular cross section. The stator coil 20 is configured of a plurality of coil segment groups 22 in which a predetermined number of (four in the present embodiment) conductor segments 21 are arranged in the radial direction and are bundled. As shown in FIGS. 2 and 4, each conductor segment 21 is inserted into the slot 13 formed in a U-shape which has a pair of leg portions 24 extending in parallel and a curved connecting portion 26 connecting the two leg portions 24, and then a portion protruding from the slot 13 is processed by bending. Each conductor segment 21 has a pair of end portions 21a protruding from one end of the stator core 10 to one side in the axial direction. In the conductor segment 21, places other than tips of the end portions 21a are insulated by an insulating film 28.

One leg portion 24 of each conductor segment 21 is inserted into a radially inner region of any one of the slots 13. The other leg portion 24 of each conductor segment 21 is inserted into a radially outer region of the slot 13 located at a position spaced a predetermined number of slots away from the slot 13 into which the one leg portion 24 is inserted. The pair of leg portions 24 of each conductor segment 21 extend in the axial direction in the slots 13. Each leg portion 24 is disposed such that a pair of wide side surfaces among outer surfaces thereof are directed in the radial direction (see FIG. 3). The leg portion 24 of the conductor segment 21 inserted into each slot 13 is arranged in the order of U phase, U phase, V phase, V phase, W phase, and W phase in the circumferential direction.

As shown in FIG. 2, each end portion 21a of the conductor segment 21 is bent to have bending directions of the conductor segments 21 radially adjacent to each other in the slot 13 reverse to each other, and is bent in the circumferential direction to be close to the end portion 21a of the corresponding conductor segment 21 having the same phase. The end portions 21a close to each other are joined together by TIG welding, laser welding, or the like. In addition, a powder coating is applied to the joined end portions 21a with an insulating powder paint (not shown). Further, the other end portion of the stator coil 20 in the axial direction is disposed such that the connecting portions 26 of the conductor segments 21 in the plurality of coil segment groups 22 (see FIG. 4) are continuous in the circumferential direction and the connecting portions 26 adjacent to each other in the circumferential direction partially overlap each other when viewed in the axial direction.

As shown in FIG. 3, the slot insulating paper 40 is inserted into the slot 13. The slot insulating paper 40 is disposed between the slot 13 and the stator coil 20. In one example, the slot insulating paper 40 is disposed to collectively surround all the conductor segments 21 disposed in one slot 13. For example, the slot insulating paper 40 has a tubular shape to surround the stator coil 20. The slot insulating paper 40 is formed in the tubular shape by bending it to conform to a shape of the slot 13 and an outer shape of the stator coil 20 in the slot 13.

The slot insulating paper 40 includes an outer circumferential portion 41 which faces the slot bottom surface 13a, a pair of side portions 43 which are connected to circumferential end portions of the outer circumferential portion 41 and are opposed to the slot side surfaces 13b, and a pair of inner circumferential portions 45 which are connected to radially inner end portions of the respective side portions 43 and are opposed to the slot upper surfaces 13c. Folds 47 extending in the axial direction are formed between the outer circumferential portion 41 and the side portions 43 and between the side portions 43 and the inner circumferential portions 45. The pair of inner circumferential portions 45 are disposed to overlap each other in the radial direction.

As shown in FIG. 2, the slot insulating paper 40 is formed to be longer than an entire length of the slot 13 in the axial direction. The slot insulating paper 40 is inserted into the slot 13 such that its end portions in the axial direction protrude from both end faces 10a of the stator core 10 in the axial direction.

Figure 5:
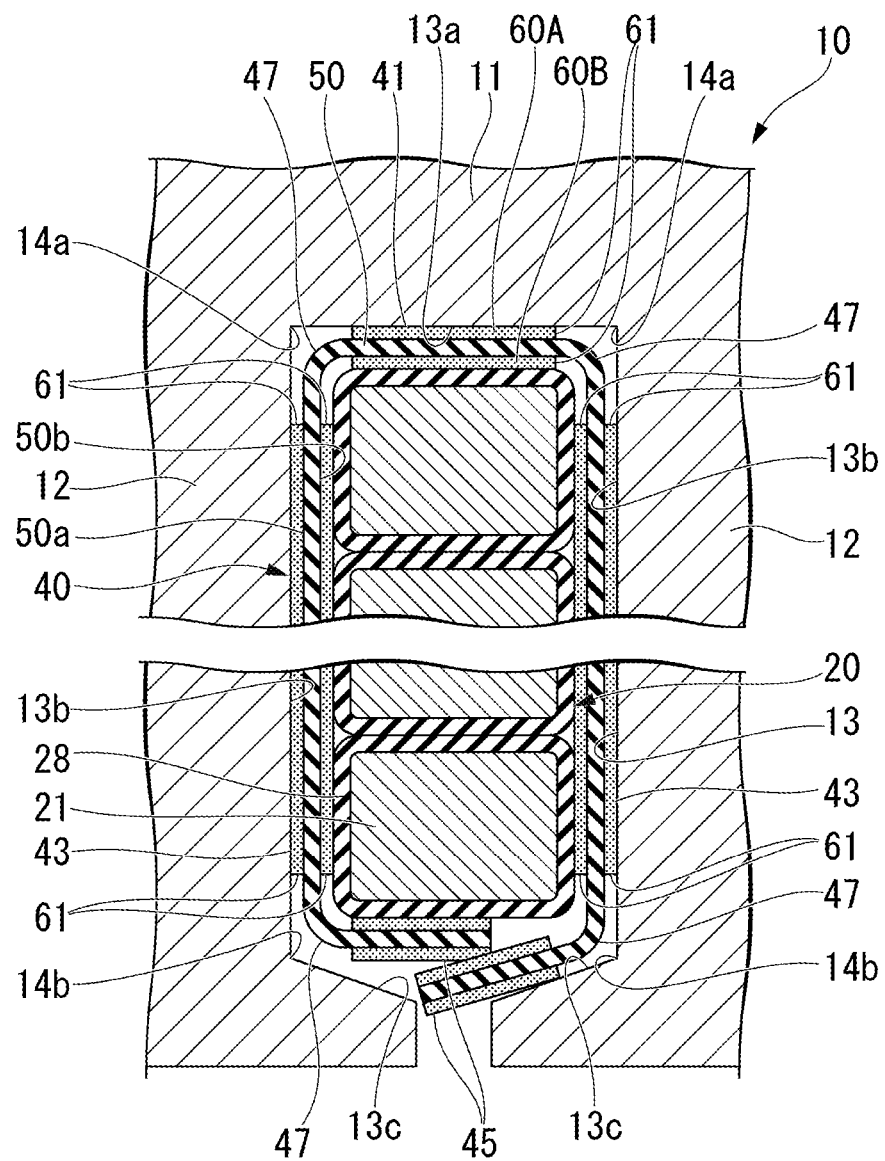
FIG. 5 is a cross-sectional view showing a part of the stator according to the first embodiment.
Figure 6:
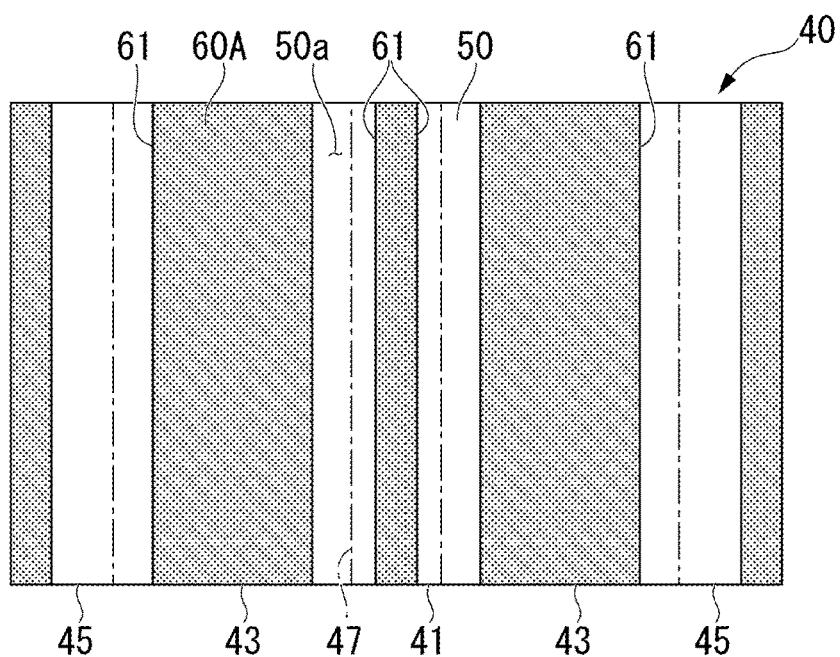
FIG. 6 is a plan view showing a state in which a slot insulating paper according to the first embodiment is developed.

FIG. 5 is a cross-sectional view showing a part of the stator according to the first embodiment. FIG. 6 is a plan view showing a state in which the slot insulating paper according to the first embodiment is developed.

As shown in FIGS. 5 and 6, the slot insulating paper 40 includes a rectangular sheet-shaped insulating base material 50 having a first main surface (a first surface) 50a and a second main surface (a second surface) 50b which are disposed in opposite directions. For example, the first main surface 50a is disposed to face the slot 13 of the insulating base material 50. The second main surface 50b is disposed to face the stator coil 20 of the insulating base material 50. Further, the slot insulating paper 40 includes a first adhesive layer 60A provided on the first main surface (first surface) 50a and a second adhesive layer 60B provided on the second main surface (second surface) 50b. In one example, the insulating base material 50 is a resin film formed of a resin material having insulating properties and excellent durability such as polyphenylene sulfide or polyethylene naphthalate. In addition, the insulating base material 50 may have a configuration in which, for example, a fiber layer formed of aramid fibers or the like is laminated on the resin film described above.

As shown in FIG. 5, the adhesive layers 60A and 60B are foamed of an adhesive. As the adhesive for forming the adhesive layers 60A and 60B, for example, a foamed adhesive which is foamed and expanded by heating and has adhesiveness can be used. The foamed adhesive is, for example, of a type in which an acrylic capsule containing liquid isopentane is dispersed in a base material made of an epoxy resin material. Thus, the foamed adhesive is heated so that the liquid isopentane inside the capsule can be vaporized and expanded to foam the base material. Also, in the following description, a case in which a foamed adhesive is used as an adhesive for forming the adhesive layers 60A and 60B will be described as an example.

When heated in the slot 13, the adhesive of the first adhesive layer 60A foams to fill a space between the insulating base material 50 and the slot 13. When the adhesive of the second adhesive layer 60B is heated in the slot 13, the adhesive foams to fill a space between the insulating base material 50 and the stator coil 20. Thus, the adhesive forming each adhesive layer 60A and 60B adheres and fixes the stator coil 20 and the stator core 10.

Exposed sections (non-adhesive regions) 61 in which the insulating base material 50 is exposed from the adhesive are formed in the first adhesive layer 60A. That is, the slot insulating paper 40 includes regions (non-adhesive regions) in which the adhesive is not disposed (applied) as the exposed sections 61. In one example, the exposed sections 61 extend in the axial direction along an entire length of the first adhesive layer 60A (see FIG. 6). Alternatively, the exposed sections 61 extend continuously at least in the axial direction, and have an axial length smaller than an axial length of the insulating base material 50, an axial length substantially the same as the axial length of the insulating base material 50, or an axial length greater than the axial length of the insulating base material 50. The exposed sections 61 are formed at places opposite to the outer corner portions (first corner portions) 14a of the slot 13 and at places opposite to the inner corner portions (second corner portions) 14b. That is, the exposed sections 61 are formed at places corresponding to the folds 47 (places corresponding to the corner portions of the stator coil 20). As a result, on the first main surface 50a of the insulating base material 50, the adhesive forming the first adhesive layer 60A is applied in stripes at intervals in a direction perpendicular to the axial direction.

In the second adhesive layer 60B, similarly to the first adhesive layer 60A, exposed sections (non-adhesive regions) 61 in which the insulating base material 50 is exposed from the adhesive are formed. The exposed sections 61 formed in the first adhesive layer 60A and the exposed sections 61 formed in the second adhesive layer 60B are provided to have front and back symmetry with respect to the insulating base material 50. Thus, the slot insulating paper 40 has front and back symmetry in the developed state.

Figure 7:
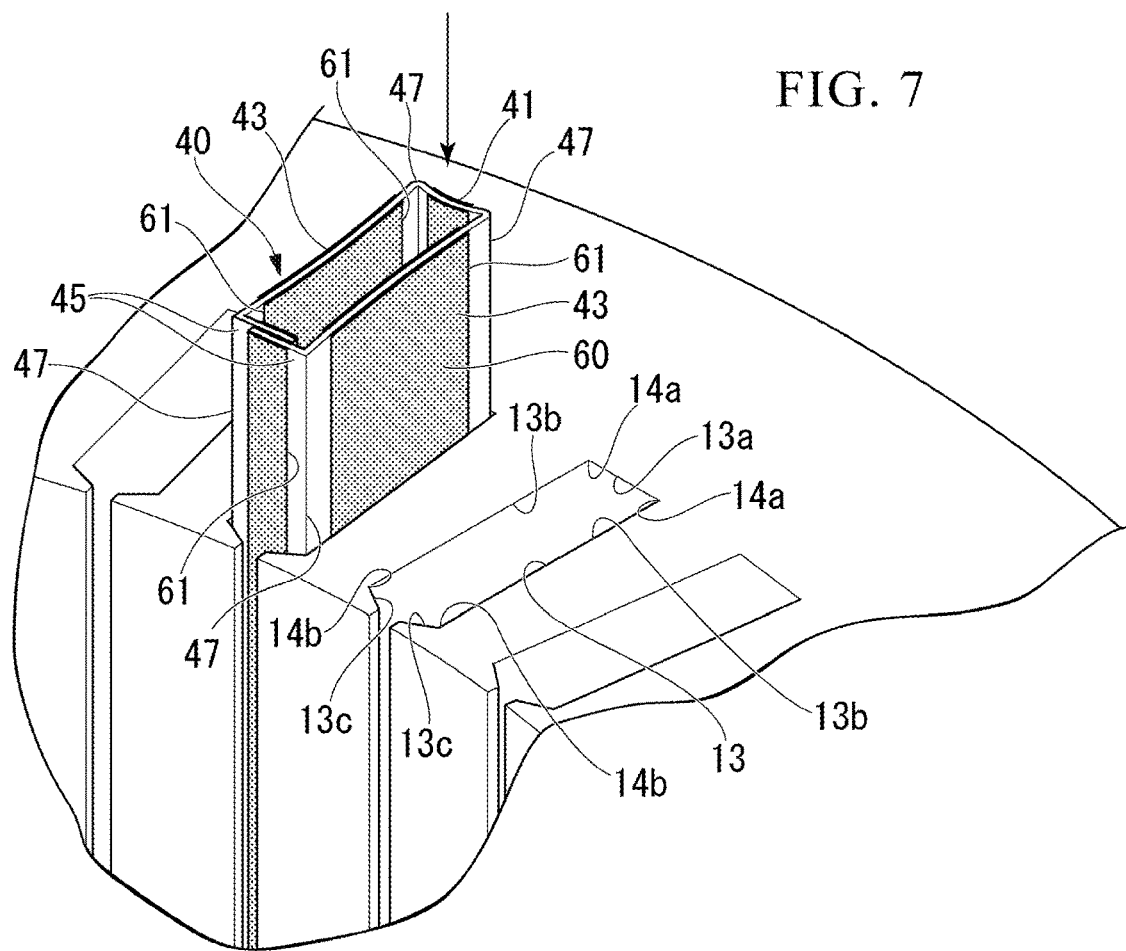
FIG. 7 is a diagram for explaining operations of the slot insulating paper according to the first embodiment, which is a perspective view of the stator showing a state in which the slot insulating paper is inserted into the slot.

Next, operations of the slot insulating paper 40 of the present embodiment will be described. FIG. 7 is a diagram for explaining operations of the slot insulating paper according to the first embodiment, which is a perspective view of the stator showing a state in which the slot insulating paper is inserted into the slot.

In a process of inserting the slot insulating paper 40 into the slot 13, the slot insulating paper 40 is deformed to conform to the shape of the slot 13 in advance, and then the slot insulating paper 40 is moved in the axial direction and is inserted into the slot 13. In the present embodiment, the slot insulating paper 40 is inserted from one opening of the slot 13 in the axial direction with the slot insulating paper 40 bent into a tubular shape having a rectangular cross section. In this case, in order to reduce a contact area of the slot insulating paper 40 with the slot 13 to be easily inserted therethrough, as shown in FIG. 7, the slot insulating paper 40 is inserted with the outer circumferential portion 41 and each side portion 43 in the slot insulating paper 40 recessed inward when viewed in the axial direction. Then, the slot insulating paper 40 easily comes into contact with the outer corner portions 14a and the inner corner portions 14b of the slot 13 at the corner portions corresponding to the folds 47.

In the present embodiment, the exposed sections 61 which extend in the axial direction and in which the insulating base material 50 is exposed from the adhesive are provided in the first adhesive layer 60A. For this reason, the adhesive can be prevented from contacting the end edge of the slot 13 and being peeled off by the exposed sections 61 being provided at places of the slot insulating paper 40 where it easily comes into contact with an end edge of the slot 13 when the slot insulating paper 40 is moved in the axial direction and is inserted into the slot 13. In particular, in the present embodiment, the exposed sections 61 are provided at places facing the outer corner portions 14a of the slot 13 and the inner corner portions 14b. Accordingly, it is possible to prevent the adhesive from contacting end edges of the outer corner portions 14a or the edge of the inner corner portions 14b and being peeled off when the slot insulating paper 40 is moved in the axial direction and is inserted into the slot 13. Therefore, generation of foreign matter when the rotary electric machine 1 is manufactured can be inhibited.

Also, in the case where the adhesive forming the first adhesive layer 60A has adhesion or adhesiveness, by providing the exposed sections 61 at places of the slot insulating paper 40 where it easily comes into contact with the end edge of the slot 13, it is possible to inhibit the slot insulating paper 40 from adhering to the slot 13 in the process of inserting the slot insulating paper 40 into the slot 13. Therefore, deterioration of inserting properties of the slot insulating paper 40 into the slot 13 can be inhibited.

Further, since the exposed sections 61 are provided to have front and back symmetry with respect to the insulating base material 50, the slot insulating paper 40 is formed with front and back symmetry. Thus, the slot insulating paper 40 can be used without distinguishing between the front and back.

In addition, since the exposed sections 61 are provided at places corresponding to the folds 47, the adhesive forming the adhesive layers 60A and 60B can be prevented from being provided at the folds 47 and being peeled off from the insulating base material 50. Therefore, generation of foreign matter when the rotary electric machine 1 is manufactured can be inhibited.

Also, since the rotary electric machine 1 and the stator 3 of the present embodiment are provided with slot insulating paper 40 described above, generation of foreign matter in manufacturing is inhibited so that occurrence of assembly failure and the like due to foreign matter can be inhibited.

Modified Example of First Embodiment

Figure 8:
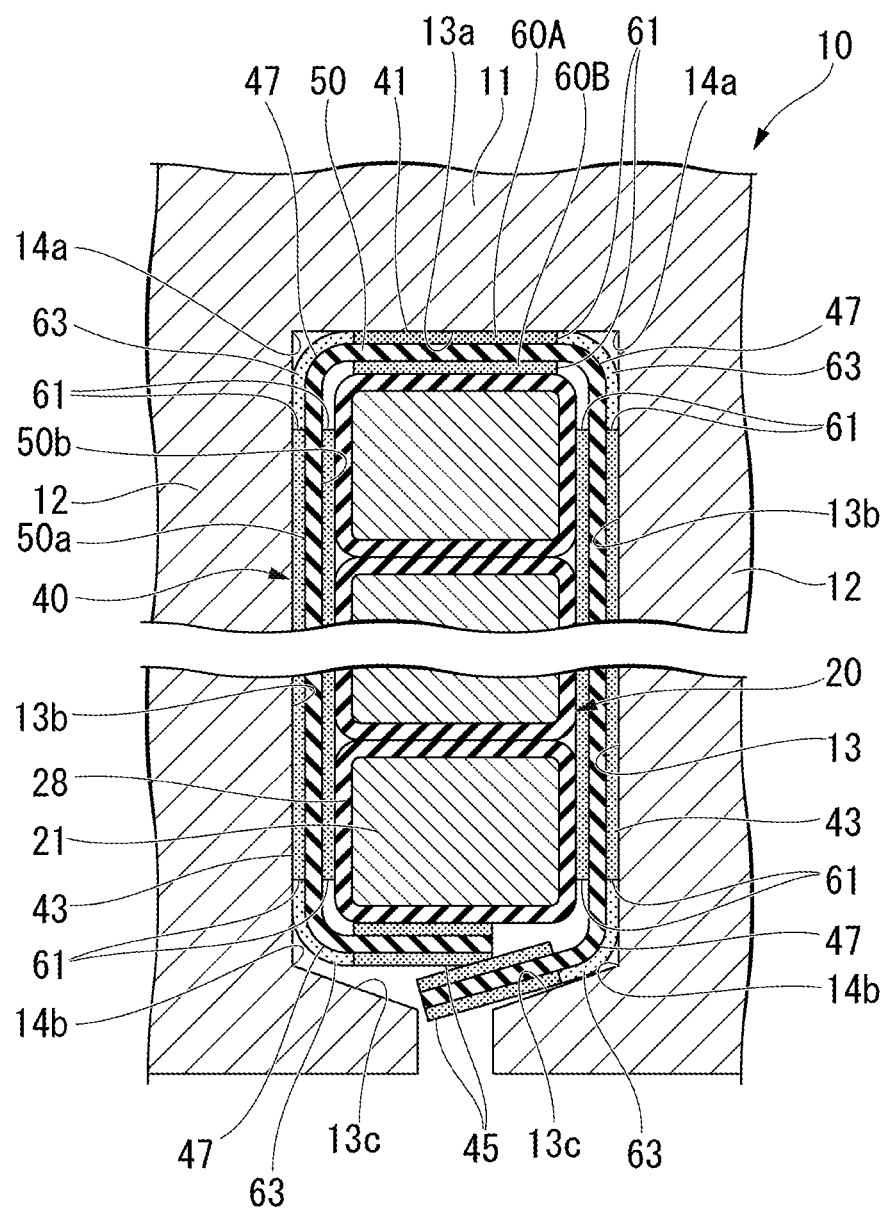
FIG. 8 is a cross-sectional view showing a part of a stator according to a modified example of the first embodiment.

FIG. 8 is a cross-sectional view showing a part of a stator according to a modified example of the first embodiment. In the first embodiment, the insulating base material 50 is exposed to the outside of the slot insulating paper 40 at the exposed sections 61. On the other hand, the modified example of the first embodiment is different from the first embodiment in that a lubricating layer 63 is provided on the first main surface 50a of the insulating base material 50 at the exposed sections 61. In addition, the same components as those in the first embodiment are denoted by the same reference numerals, and a detailed description thereof will be omitted (the same applies to subsequent embodiments).

As shown in FIG. 8, a lubricating layer 63 formed of a lubricant is provided on the first main surface 50a of the insulating base material 50 at each exposed section 61. As the lubricant, for example, a resin material having a smaller frictional resistance to the stator core 10 than that of the insulating base material 50 can be used.

According to this configuration, the lubricating layer 63 is provided at places where it easily comes into contact with the end edge of the slot 13 when the slot insulating paper 40 is moved in the axial direction and is inserted into the slot 13. Accordingly, the slot insulating paper 40 can be smoothly inserted into the slot 13.

Second Embodiment

Figure 9:
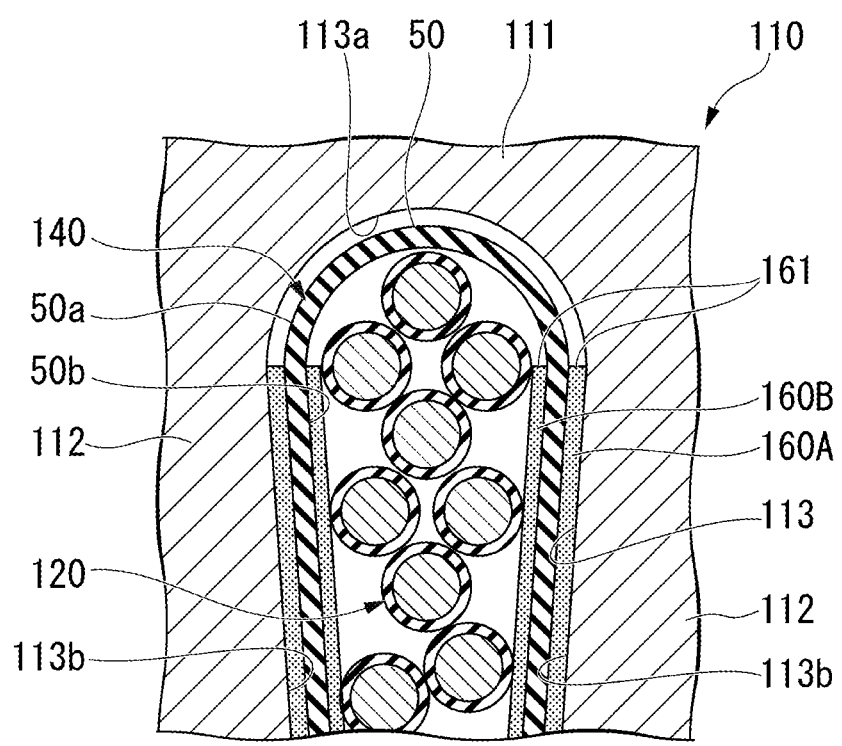
FIG. 9 is a cross-sectional view showing a part of a stator according to a second embodiment.

FIG. 9 is a cross-sectional view showing a part of a stator according to a modified example of the first embodiment. In the first embodiment, the slot bottom surface 13a of the slot 13 is formed in a planar shape. On the other hand, the second embodiment is different from the first embodiment in that a slot bottom surface 113a of a slot 113 is formed in a concave curved shape.

As shown in FIG. 9, the slot 113 is formed to be elongated in the radial direction when viewed in the axial direction. The slot 113 has a rectangular shape having a major axis in the radial direction. An inner surface (a slot forming surface) of a stator core 110 surrounding the slot 113 includes a slot bottom surface (a first slot surface or a first slot forming surface) 113a which faces inward in the radial direction, and a pair of slot side surfaces (second slot surfaces or second slot forming surfaces) 113b which extend radially inward from both circumferential end portions of the slot bottom surface 113a. The slot bottom surface 113a is formed in an arc shape when viewed in the axial direction. The slot bottom surface 113a smoothly connects the pair of slot side surfaces 113b. In the slot 113, for example, a stator coil 120 formed by winding a wire having an insulating film around teeth 112 protruding from a back yoke 111 is disposed.

The slot insulating paper (insulating member) 140 is inserted into the slot 113. In one example, the slot insulating paper 140 has a tubular shape to surround the stator coil 120. The slot insulating paper 140 has a cylindrical shape curved to conform to a shape of the slot 113. The slot insulating paper 140 includes an outer circumferential portion 141 facing the slot bottom surface 113a, and a pair of side portions 143 which are connected to circumferential end portions of the outer circumferential portion 141 and are opposed to the slot side surfaces 113b. The outer circumferential portion 141 and each side portion 143 are smoothly connected.

The slot insulating paper 140 includes a rectangular sheet-shaped insulating base material 50 having a first main surface (a first surface) 50a and a second main surface (a second surface) 50b which are disposed in opposite directions. For example, the first main surface 50a is disposed to face the slot 113 of the insulating base material 50. The second main surface 50b is disposed to face the stator coil 120 of the insulating base material 50. Further, the slot insulating paper 140 has a first adhesive layer 160A provided on the first main surface (first surface) 50a and a second adhesive layer 160B provided on the second main surface (second surface) 50b. Each adhesive layer 160A and 160B is formed of an adhesive like the adhesive layer 60A and 60B of the first embodiment.

An exposed section (a non-adhesive region) 161 where the insulating base material 50 is exposed from the adhesive is formed in the first adhesive layer 160A. The exposed section 161 extends in the axial direction along an entire length of the first adhesive layer 160A. Alternatively, the exposed section 161 extends continuously at least in the axial direction, and has an axial length smaller than the axial length of the insulating base material 50, an axial length substantially the same as the axial length of the insulating base material 50, or an axial length greater than the axial length of the insulating base material 50. The exposed section 161 is formed at a place opposite to the slot bottom surface 113a of the slot 113.

In the second adhesive layer 160B, similarly to the first adhesive layer 160A, an exposed section (anon-adhesive region) 161 where the insulating base material 50 is exposed from the adhesive is formed. The exposed section 161 formed in the first adhesive layer 160A and the exposed section 161 formed in the second adhesive layer 160B are provided symmetrically with respect to the insulating base material 50. Thus, the slot insulating paper 140 has front and back symmetry in the developed state.

As described above, according to the present embodiment, the first adhesive layer 160A is provided with the exposed section 161 which extends in the axial direction and the insulating base material 50 is exposed from the adhesive. Accordingly, similarly to the first embodiment, the adhesive can be prevented from contacting the end edge of the slot 113 and being peeled off when the slot insulating paper 140 is moved in the axial direction and is inserted into the slot 113.

Particularly, in the configuration in which the slot 113 is formed to be elongated in the radial direction as viewed in the axial direction as in the present embodiment, the slot insulating paper 140 easily contacts the slot bottom surface 113a of the slot 113. In the present embodiment, since the exposed section 161 is provided at a position opposite to the slot bottom surface 113a, when the slot insulating paper 140 is moved in the axial direction and is inserted into the slot 113, the adhesive can be prevented from contacting the edge of the slot bottom surface 113a and being peeled off. Therefore, generation of foreign matter when the rotary electric machine 1 is manufactured can be inhibited.

The present invention is not limited to the embodiments described above with reference to the drawings, and various modifications can be considered within the technical scope.

For example, although the exposed sections 61 and 161 are provided on both the first adhesive layers 60A and 160A and the second adhesive layers 60B and 160B in the above embodiments, it is possible to provide the exposed sections 61 and 161 only in at least the first adhesive layer 60A and 160A facing the slots 13 and 113.

Moreover, although the exposed sections 61 and 161 are formed only at the place corresponding to each fold 47 in the above embodiments, the present invention is not limited thereto. The exposed sections may be formed at places other than the places corresponding to the folds 47 in addition to the places corresponding to the respective folds 47, or formed only at the places corresponding to the folds 47 among the respective folds 47.

Also, although the foamed adhesive has been explained as an example of adhesive for forming the adhesive layers 60A, 60B, 160A and 160B in the above embodiments, the present invention is not limited thereto, and the adhesive may be a thermoplastic resin material or the like that does not have foamability, for example.

In addition, it is possible to replace components in the above-described embodiment with known components as appropriate without departing from the spirit of the present invention, and it is also possible to appropriately combine the above-described embodiments and variations.

REFERENCE SIGNS LIST

1 Rotary electric machine
3 Stator
10 Stator core (iron core)
13, 113 Slot
13a, 113a Slot bottom surface
13b Slot side surface
14a Outer corner portion
14b Inner corner portion
20, 120 Stator coil (coil)
40, 140 Slot insulating paper (insulating member)
47 Fold
50 Insulating base material
50a First main surface (main surface)
50b Second main surface (main surface)
60A First adhesive layer (adhesive layer)
60B Second adhesive layer (adhesive layer)
61, 161 Exposed section
63 Lubricating layer

The invention claimed is:

1. An insulating member inserted into a slot of an iron core of a rotary electric machine and thereby insulating the iron core from a coil disposed in the slot, comprising:
a sheet-shaped insulating base material having a first surface and a second surface; and
an adhesive layer which is provided on at least one of the first surface and the second surface of the insulating base material and formed of an adhesive,
wherein the adhesive layer is provided with an exposed section which extends in an axial direction of the iron core and in which the insulating base material is exposed from the adhesive, and
wherein the exposed section is entirely recessed from an outer surface of the adhesive layer.

2. The insulating member according to claim 1, wherein the exposed section is provided at a place opposite to a first slot surface facing inward in a radial direction of the iron core among inner surfaces of the iron core surrounding the slot.

3. The insulating member according to claim 1,
wherein the slot has a rectangular shape extending in the radial direction of the iron core when viewed in the axial direction, and
the exposed section is provided at a place opposite to a first corner portion between a first slot surface facing inward in the radial direction and a second slot surface facing in a circumferential direction of the iron core among the inner surfaces of the iron core.

4. The insulating member according to claim 1, wherein the exposed section is provided at a place opposite to a second corner portion formed at a radially inner end portion of the iron core in a second slot surface facing in the circumferential direction of the iron core among the inner surfaces of the iron core.

5. The insulating member according to claim 1, wherein the insulating base material is provided with a fold, and the exposed section is provided at a place corresponding to the fold.

6. The insulating member according to claim 2, wherein the exposed section is recessed such that the exposed section is spaced apart from the first slot surface with a gap therebetween.

7. The insulating member according to claim 3, wherein the exposed section is recessed such that the exposed section is spaced apart from a surface of the first corner portion with a gap therebetween.

8. A stator of a rotary electric machine comprising:
an insulating member; and
an iron core,
wherein the insulating member is inserted into a slot of the iron core of the rotary electric machine and thereby insulating the iron core from a coil disposed in the slot, the insulating member comprising:
a sheet-shaped insulating base material having a first surface and a second surface; and
an adhesive layer which is provided on at least one of the first surface and the second surface of the insulating base material and formed of an adhesive,
wherein the adhesive layer is provided with an exposed section which extends in an axial direction of the iron core and in which the insulating base material is exposed from the adhesive, and
wherein the exposed section is entirely recessed from an outer surface of the adhesive layer.

9. A rotary electric machine comprising the stator of the rotary electric machine according to claim 8.

* * * * *